Oct. 15, 1929.   E. L. CONNELL ET AL   1,732,038
STUD SETTING MACHINE
Filed Jan. 30, 1928   2 Sheets-Sheet 1

Inventors
Edwin L. Connell
and
Franklin Schneider
By Brackett & Hyde
Attorneys

Oct. 15, 1929.  E. L. CONNELL ET AL  1,732,038
STUD SETTING MACHINE
Filed Jan. 30, 1928   2 Sheets-Sheet 2

Inventors
Edwin L. Connell
and
Franklin Schneider
By Brockett & Hyde
Attorneys

Patented Oct. 15, 1929

1,732,038

UNITED STATES PATENT OFFICE

EDWIN L. CONNELL AND FRANKLIN SCHNEIDER, OF CLEVELAND, OHIO, ASSIGNORS TO THE VAN DORN ELECTRIC TOOL COMPANY, OF CLEVELAND, OHIO, A CORPORATION OF OHIO

STUD-SETTING MACHINE

Application filed January 30, 1928. Serial No. 250,545.

This invention relates to stud setting machines, such as are used for screwing studs into automobile engine blocks, crankshafts or the like, for setting bolts, nuts or the like, or for threading, tapping, or like operations.

The object of the invention is to provide an improved machine of this kind in which the tool spindle can be driven reversely in opposite directions to perform the threading or screwing operation and to withdraw the tool from the work or the chuck from the stud, and in which the forward drive is produced positively, but only until the load or duty has mounted to a predetermined degree, which terminates the forward operation, so that a stud, for example, can be screwed in until the resistance to threading amounts to a predetermined degree.

A further object of the invention is to provide a stud setting or like machine driven by its own source of power and in which the forward driving operation is controlled in accordance with the load or duty on the machine or driver and independently of the effort of the operator, but in which the operator is provided with all the usual controls and can readily manipulate all parts of the apparatus and its control system.

A still further object of the invention is to provide a stud setting or like machine in which the tool spindle has longitudinal motion in its driving members, is capable of rotation in opposite directions and is driven for the purpose by dental clutch mechanism, and in which all driving members for the spindle are also driven through a friction clutch under the control of both the operator and of the machine itself.

Further objects of the invention are in part obvious and in part will appear more in detail hereinafter.

Figure 1:
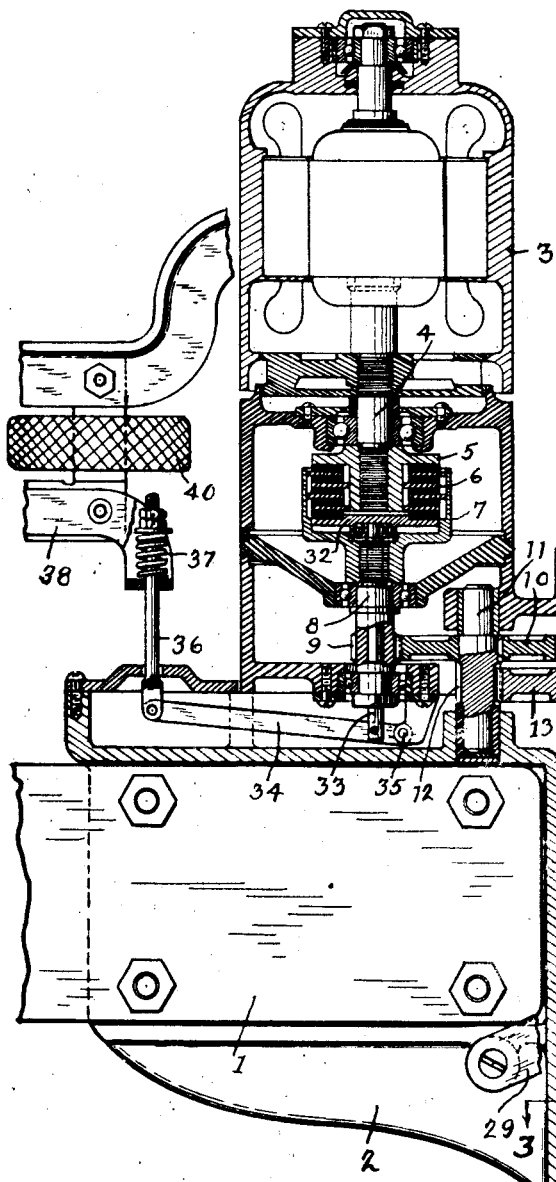
Figure 3:
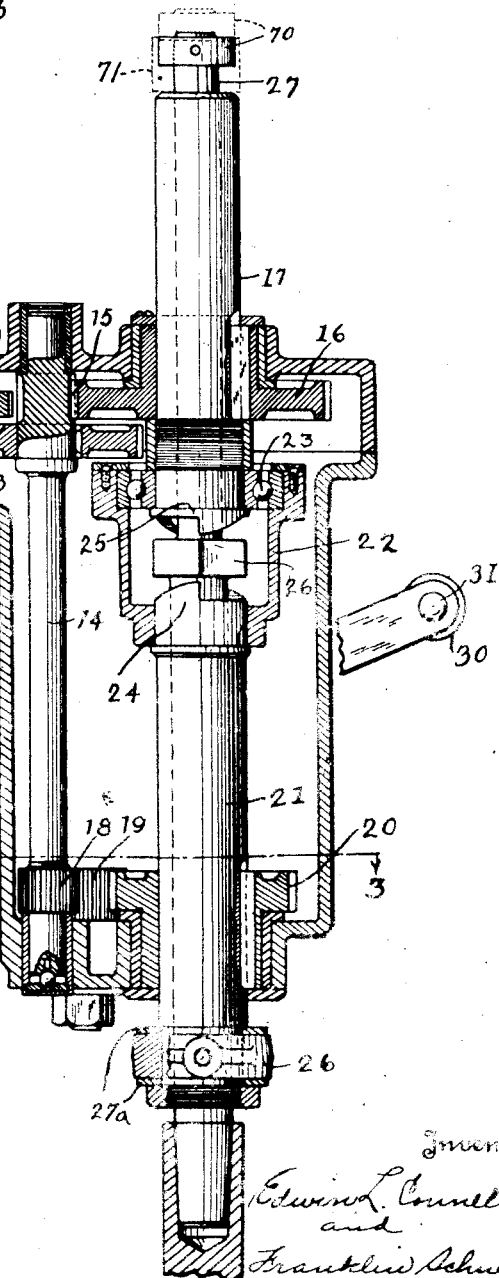
Figure 3:
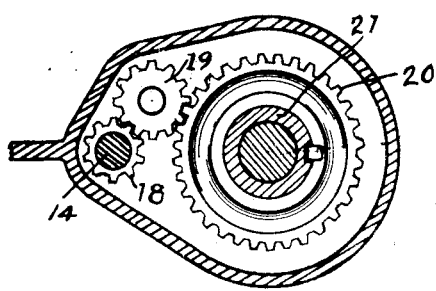
Figure 2:
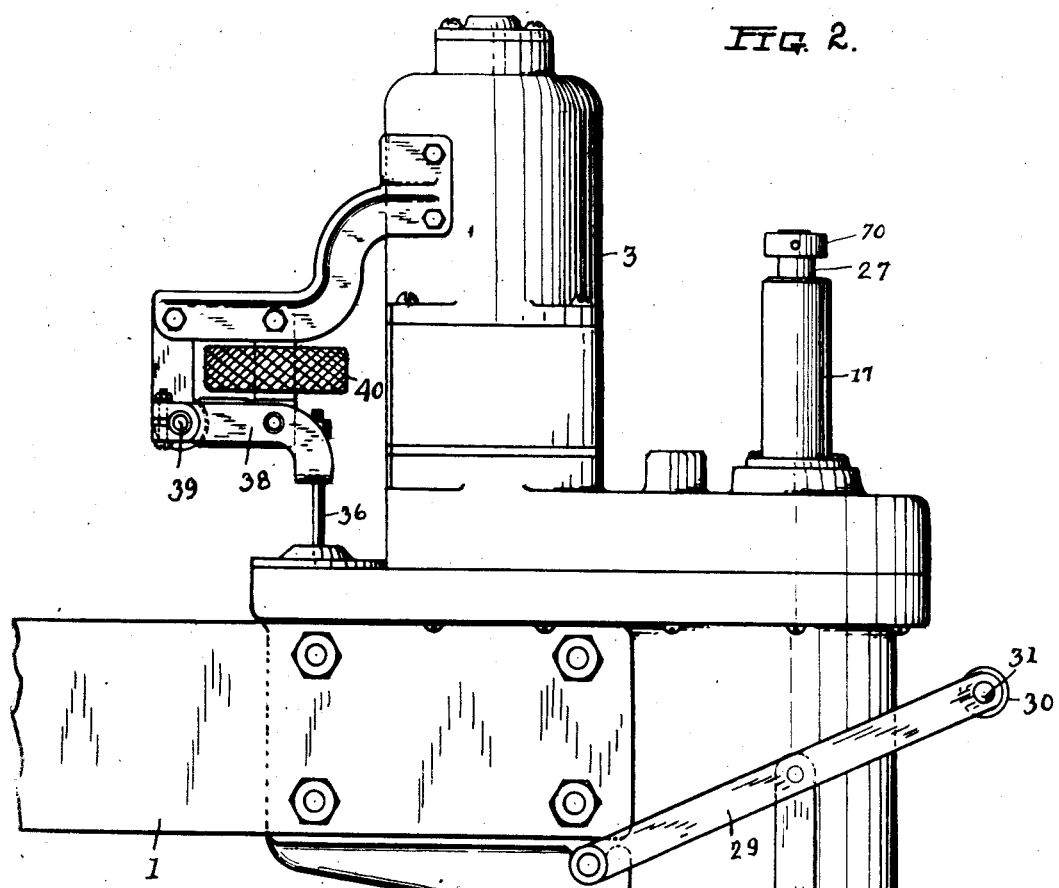
Figure 4:
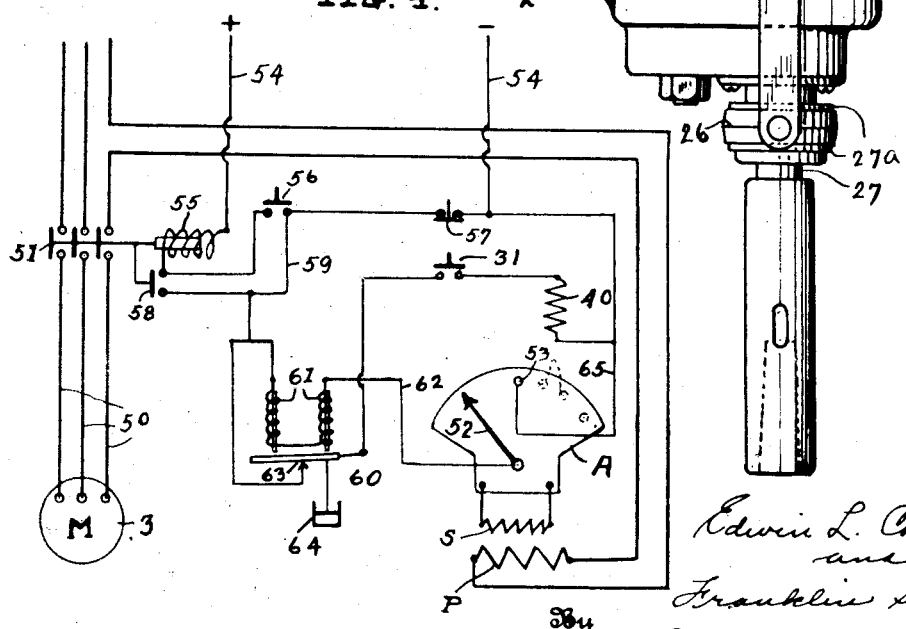

In the drawings, Fig. 1 represents a central elevation through one form of machine embodying the invention; Fig. 2 is a side elevation; Fig. 3 is a detail sectional plan view on the line 3—3, Fig. 1; and Fig. 4 is a diagrammatic view showing the electric circuits.

The machine shown in the drawings comprises a suitable arm 1 supporting the operating parts of the mechanism and arranged to move back and forth horizontally with more or less universal movement, so that the tool can be brought over any particular working spot within a reasonable area, the supports for said arm forming no part of the present invention and therefore being omitted. The arm, of course, is carried on a frame and is manipulated something after the fashion of a radial drill.

On said arm is mounted a frame 2 supporting a suitable driving or operating member, such as the electric motor 3, the spindle 4 of which is journalled in the casing and is provided at one end with a driver 5 keyed to rotate alternate ones of a series of friction driving discs 6, the intervening ones of which are keyed to rotate with a hollow disc clutch member 7 attached to the hollow shaft 8. The several discs 6 are axially movable, however, as is usual in these clutches. Said shaft forms the driver for the tool spindle, but is connected to operate the same through suitable reduction gearing. As illustrated, said shaft is provided with a small pinion 9 driving a gear 10 of an intermediate shaft 11 provided with a pinion 12 operating a gear 13 on a shaft 14, journaled in the casing. Said shaft, at its upper end, has a small pinion 15 which directly drives a gear 16 on an upper operating quill 17. The lower end of shaft 14 is provided with a small pinion 18 which, through an intermediate pinion 19 (Fig. 3), drives a large gear 20 on the lower quill member 21, so that members 17 and 21 rotate in opposite directions. Said quill members are of sleeve form and are provided with connecting means, such as the hollow box 22 on the lower member 21 and connected to the upper quill 17 through the ball bearing 23. The two quill members carry dental clutch members facing in opposite directions. As shown, member 21 carries the dental clutch member 24 to which the box 22 is connected, while the inner member of the ball bearing ring 23 is attached to the upper clutch member 25. Between said two clutch members is located a cooperating clutch member 26 fast with the tool spindle 27 and arranged to slide longitudinally in the quills, the latter being splined for longitudinal movement in their respective driving gears 16, 20. Suitable means is provided for producing and directing longitudinal feed of the quills to start the operation, such as a ring 26 journalled between two collars 27ª on the lower quill and connected by one or more links 28 to an operating lever 29 having a handle 30 accessible at the front of the machine and at one end of which is located a normally open thumb operated switch member 31.

It was stated that the discs of the disc clutch are movable lengthwise of the axis, as is usual. That is for the purpose of producing the necessary driving friction between them. To produce such operation the disc clutch is provided at one end with the usual operating plate 32 movable within the box 7 and journalled on one end of a thrust rod 33 movable longitudinally in the hollow shaft 8 and actuated by a suitable operator. The latter may be manually operated but, as shown, the operator comprises a lever 34 to which the rod 33 is connected, said lever being pivoted in the frame at 35 and at its opposite end connected by a link 36 and through an adjustable compression spring 37 with an armature carrying arm 38 pivoted at 39 in the frame, the armature thereof cooperating with a coil 40.

In the operation of the apparatus so far described, the motor is started and lever 34 is actuated either manually or by the electromagnet described to raise member 32 and couple the friction clutch, which drives the quills 17, 21 in opposite directions. Assuming the tool spindle 27 to carry a threading tool at its lower end, such as a tap, if the handle 30 is depressed, the tap is introduced into the hole to be threaded, downward movement of the spindle 27 is retarded and the upper clutch member 25 is engaged with the clutch 26 to drive the spindle in the forward direction. The hand is pressed downwardly upon handle 30 and the tap is allowed to feed through the work. When the tapping operation is finished, the handle 30 is raised, the quills 17, 21 both rise and the lower clutch member 24 is coupled to the clutch member 26 and the tap is backed out of the work. At any time the lever 34 may be actuated to release the friction clutch and stop the drive to the reducing gearing and to the quill members, as in case an obstacle is encountered.

For setting studs in engine blocks and the like, as referred to, a suitable control system is provided, being indicated more or less conventionally in Fig. 4. The motor 3 is shown as a three-phase motor with the leads 50 including a switch having one or more blades 51, one of the motor leads including the primary P of a transformer, the secondary S of which supplies the necessary current for actuating an ammeter A with a movable contact arm 52 forming one member of a switch and cooperating with a contact 53 suitably adjustable circumferentially of the instrument to various positions, as indicated by the dotted lines, Fig. 4. 54 indicates the leads for a control circuit, which may be an ordinary 110-V. line, one of the leads being connected to a coil 55 in circuit with a normally open starting button 56 and a normally closed stop button 57. The coil 55, when energized, closes the switch 51, and a tail on said switch carries a contact 58 adapted when said coil is energized to close a shunt circuit 59 around the starting switch 56 and maintain the coil 55 energized until the stop button is depressed. Momentary depression of starting button 56 therefore closes the main switch 51 and the maintaining circuit 59 keeps the motor running until the stop button is depressed.

In a branch from the maintaining circuit 59 is a normally closed quick-opening and time-delay-closing relay marked generally 60, including a coil or coils 61 in circuit through a wire 62 with the movable ammeter arm 52 and adapted when said coil is energized to open the switch 63. The opening movement of said switch is rapid, but its closing movement is delayed in any suitable manner, as by the conventionally indicated dashpot 64. Switch 63 is in circuit with the manually controlled normally open switch 31 formerly referred to as located on the handle 30, as well as with the coil 40, the movable armature of which is connected to lever 34. The adjustable contact 53 is connected by a wire 65 to the other side of the line.

The system described operates as follows: Let us assume an engine block in place on the work bed with a number of studs threaded at both ends and required to be screwed into the block to proper depth. These studs are one by one inserted into a holding chuck and then introduced into their respective holes, or the studs may be started by hand into the series of holes and the chuck brought up to the top of each stud and threaded upon it for the driving operation, as desired. An ordinary chuck, such as is used for this purpose, is employed, in which the chuck tightly and frictionally grips the stud to drive it positively in the forward direction but is self-releasing so that on the rearward drive of the spindle the chuck is unscrewed from the stud more readily than the stud may be unscrewed from the block.

Assuming now that a stud has been introduced by hand into its proper opening, the starting button 56 is depressed to start the motor. No other parts rotate, because coil 40 is not yet energized and the friction clutch is released. With the chuck in the tool spindle, the hand is applied to handle 30 and the chuck is brought into position over the work and switch 31 is closed and is held closed so long as the operator desires the spindle to be driven. Switch 63 is closed and coil 40 is therefore energized to close the friction clutch. The downward pressure on the handle 30 couples the clutch members 25 and 26 and the tool spindle is rotated in the forward direction, first screwing the chuck upon the stud or starting the stud, as the case may be, and then continuing to screw the stud into the engine block. At first, the load upon the spindle, to wit, the resistance to the screwing operation, is low, and arm 52 of the ammeter is at the left, or near to zero position. Coil 61 is therefore deenergized because the switch 52, 53 is open. However, when the stud is driven home or becomes so tightly screwed into the opening that the resistance to further screwing increases the load, the ammeter arm 52 moves over to the right until finally it reaches contact 53, closing a circuit through said contacts by way of the coil 61, which attracts its armature and opens the switch 63. Notwithstanding the fact that the switch 31 may be held closed, the coil 40 is de-energized by the opening of switch 63. As a result, the disc clutch is immediately released and the power drive from the motor to the tool spindle is broken, so that the tool spindle, the quill members which drive it, and the reducing gearing all stop rotating. The increase in the load therefore is the safety and controlling factor which stops the drive to the spindle and chuck at the desired point. By adjusting the contact 53 to one position or another, the spindle rotation may be stopped when any desired load or duty or resistance has been reached, thus closely calibrating the machine to the desirable or required maximum torque, and all studs may be screwed in the same amount or to the same distance.

Of course, as soon as the forward screwing operation is completed, it is necessary to back off the chuck, which requires reverse rotation of the spindle. As soon as the disc clutch is opened the load on the motor becomes practically zero and the ammeter arm 52 moves over to the left and away from contact 53 and de-energizes coil 61. If the operator maintains the switch 31 closed with his thumb, as he should, the armature of coil 61 would immediately close switch 63, energize coil 40, close the clutch and resume the drive to the spindle, with a fluttering action causing the motor effect to be intermittenly applied to the tool spindle. Such operation may be useful in certain cases, as for setting bolts or nuts, and may be taken advantage of, but preferably, and as shown, the relay described has its armature loaded so that it returns to close the switch 30 relatively slowly, because of the dashpot 64 or some like retarding device. The closing movement may occupy one or two seconds, just sufficient time to enable the operator to reverse his effort upon handle 30 and raise the same so as to uncouple the upper clutch member 25 and couple the lower clutch member 24 to the spindle. Consequently, when the clutch 63 is finally closed by the relay operation the spindle is promptly rotated in the reverse direction and backs the chuck off the work, the operation being continued until the chuck is entirely free, whereupon switch 31 is released and the apparatus is ready for application of the chuck to a new stud to drive it in.

Of course, the operator can remove his thumb from the control switch 31 as soon as the forward threading operation is completed, which again will de-energize coil 40 and permit the friction clutch to release. The handle 30 is then raised to couple the reverse clutch members and the switch 31 is again closed. Such an arrangement would avoid any necessity for a retarding device on the relay.

This mechanism enables studs to be rapidly screwed into openings with uniform results and reduces the cost for assembling such devices.

The machine may also be used as a screw driver or for screwing home either nuts or bolts. In all three operations forward rotation is desirable until the screw, nut or bolt is screwed home, and the tool, such as the screw driver bit, or nut or bolt socket, is then removed from the article and another operation performed. No reverse rotation is necessary. Therefore, in the present tool the spindle 27 may be extended and provided with a collar 70 rotatable therewith. This collar, in ordinary operations, such as screwing studs or the like, moves back and forth with the spindle and does not contact with the upper quill 17. In using the machine as a screw driver, or with bolts or nuts, the spindle 27 is raised by hand to the dotted line position, Fig. 1, in which the clutch member 26 is coupled with the upper clutch member 25, and a split collar 71 is inserted between the upper end of the quill 17 and the collar 70, thus maintaining the spindle in its upper position with the forward drive connected. With the machine so arranged, the spindle cannot be reversely rotated, and by equipping it with a screw driver bit, or a nut or bolt socket or chuck, the screw, bolt or nut can be screwed in until operation of the ammeter contacts 52, 53, releases the friction clutch, and the ammeter can be set to calibrate the screwing motion to any desirable torque, as before described.

What we claim is:

1. Apparatus of the class described, comprising a tool spindle, an electric motor for operating the same, a switch controlling said motor, a coil adapted when energized to render said motor effective upon said spindle, and a relay for controlling said coil, said relay being sensitive to the current supplied to said motor.

2. Apparatus of the class described, comprising a tool spindle, an electric motor for operating the same, a switch controlling said motor, a coil adapted when energized to render said motor effective upon said spindle, and a relay for controlling said coil, said relay being senistive to the current supplied to said motor, and adapted upon rise in said current to a predetermined maximum to actuate said relay and de-energize said coil.

In testimony whereof we hereby affix our signatures.

EDWIN L. CONNELL.
FRANKLIN SCHNEIDER.